(12) United States Patent
Dharamshi

(10) Patent No.: US 6,895,575 B2
(45) Date of Patent: May 17, 2005

(54) GENERIC JAVA RULE ENGINE FRAMEWORK

(75) Inventor: Gautam Dharamshi, Mountain View, CA (US)

(73) Assignee: Sap AG, Walldorf (DE)

( * ) Notice: Subject to any disclaimer, the term of this patent is extended or adjusted under 35 U.S.C. 154(b) by 649 days.

(21) Appl. No.: 09/885,836

(22) Filed: Jun. 20, 2001

(65) Prior Publication Data

US 2002/0199171 A1 Dec. 26, 2002

(51) Int. Cl.$^7$ ................................. G06F 9/44
(52) U.S. Cl. ..................... 717/117; 717/118; 706/45
(58) Field of Search ................. 717/104, 108, 717/114–118, 124–125, 128, 148; 706/45–47

(56) References Cited

U.S. PATENT DOCUMENTS

| | | | |
|---|---|---|---|
| 5,179,633 A | | 1/1993 | Barabash et al. |
| 5,390,286 A | | 2/1995 | Ramakrishna |
| 5,720,009 A | | 2/1998 | Kirk et al. |
| 6,018,732 A | | 1/2000 | Bertrand et al. |
| 6,094,729 A | | 7/2000 | Mann |
| 6,263,358 B1 | * | 7/2001 | Lee et al. ................... 718/100 |
| 6,266,805 B1 | * | 7/2001 | Nwana et al. ............... 717/104 |
| 6,314,555 B1 | * | 11/2001 | Ndumu et al. .............. 717/101 |
| 6,550,057 B1 | * | 4/2003 | Bowman-Amuah ......... 717/126 |
| 6,560,592 B1 | * | 5/2003 | Reid et al. ..................... 707/2 |
| 6,606,744 B1 | * | 8/2003 | Mikurak ...................... 717/174 |
| 6,618,856 B2 | * | 9/2003 | Coburn et al. .............. 717/135 |
| 6,625,651 B1 | * | 9/2003 | Swartz et al. ............... 709/226 |
| 6,732,167 B1 | * | 5/2004 | Swartz et al. ............... 709/223 |
| 6,745,170 B2 | * | 6/2004 | Bertrand et al. .............. 706/45 |
| 6,745,382 B1 | * | 6/2004 | Zothner ...................... 717/107 |

OTHER PUBLICATIONS

Peuschel et al, Concepts and implemenation of rule based process engine, ACM pp 262–279, 1992.*
Inder, "A tool for internet orienetd knowledge based systems", ACM SAC, pp 34–39, 2000.*
Feldman et al, "A framework for specifying explict bias for revision of approximate inormation extraction rules", ACM KDD, pp 189–197, 2000.*
Biswas et al, "A rule based network for efficient implemenation of a mixed initiative reasoning scheme", ACM, pp 123–130, 1989.*
Robert Inder, A Tool for Internet–Oriented Knowledge Based Systems, ACM, Mar. 2000, pp. 34–39.

* cited by examiner

*Primary Examiner*—Anil Khatri
(74) *Attorney, Agent, or Firm*—Blakely Sokoloff Taylor & Zafman LLP

(57) ABSTRACT

A generic Java rule engine framework that will permit a rule engine to be called based upon events captured from objects without requiring object programmers to explicitly insert hooks for calling the rule engine within the objects. A business-to-business electronic marketplace can be outfitted with such a framework for acting upon events occurring within objects. The framework comprises utilizing a standard Java debugging interface to accept events and a rule engine to act upon such events.

19 Claims, 3 Drawing Sheets

GENERIC JAVA RULE ENGINE FRAMEWORK

FIELD OF THE INVENTION

This invention relates to providing a generic Java rule engine framework that will permit the capture of events from Java objects themselves and the recording and/or processing of such events independent of application programming or object model. The present invention is particularly useful in many environments including a business-to-business electronic marketplace where business events that occur frequently may cause a need for further processing.

BACKGROUND OF THE INVENTION

Rules engines have been used to affect objects. In order to permit the application of rules to events occurring within objects, a rule engine must be capable of capturing events from the objects and programming against them. An overall architecture of a rule engine that hosts an application according to the prior art is depicted in FIG. 1. Application objects 10, 11 and 12 call rule engine 20 upon the occurrence of predefined events. Rule engine 20 evaluates rule conditions, such as rule condition 50, to optimize when the rule should even be considered for execution by building RETE NET 30 using rule options expressed by the user. Rule 70 is accessed, as is rule condition 50. The rule is then executed as shown in box 60.

In order to function properly, rule engine 20 imposes certain requirements upon application objects 10, 11 and 12. First of all, rule engine 20 must be able to receive the events from application objects 10, 11 and 12 that are to be used with rule 70. Events that may be desirable to receive include field/property modification events, method calling events, object creation events and object deletion events.

In order for a programmer to be able to code rules and conditions, such as rule 70 and condition 50, that can be used against application objects 10, 11 and 12, the exact types of objects being used must be known to the programmer as well as details on the properties that are being used in the rules and conditions. The programmer must employ syntax that is able to express a wide variety of logistics while programming the rules and conditions.

Traditionally application programmers had two methods with which to accomplish this. The first is to have the rule engine define an API for the events that it requires. Under this scenario, the application objects would fire such events explicitly when they occur.

The second method would be to have the rule engine define an object model that internally fires events automatically. Programmers of such objects would then have to ensure that each application object would adhere to the object model.

In either of these prior art solutions, programmers of objects would have to explicitly program hooks into the objects that would reach out of the object and engage the rule engine when a specific event occurred through either programming the objects to a predefined object model or to meet the API's requirements. Thus, programmers had to be aware of what the rule engines were looking for, spend time coding in the appropriate hooks and adhere to the syntax supported by the object model or API. If an unforeseen rule were to be developed for use, the programming of the objects may have to be revisited in order to update the existing hooks or add new hooks to account for the new rule. Thus, these prior art frameworks are inefficient and may cause delays in deployment of needed services due to more time-intensive programming and the possibility of needed reprogramming.

The number of Java based applications have grown considerably along with the growth of the Internet. In certain systems, events occurring within Java objects may cause a desire to take some action. One such system is a business-to-business electronic marketplace. For instance, in an electronic marketplace a shopping basket may be a Java object. When a method is executed that adds an item to that shopping basket, it may be desirable to cause some action to occur through the use of a rules engine, such as offering additional items to the shopper for possible addition to the shopping basket that relate to the newly added item.

Thus a need exists for a framework that would permit the application of Java rules through a rule engine without the need for the explicit insertions of hooks within Java objects.

SUMMARY OF THE INVENTION

An embodiment of the present invention provides a generic Java rule engine framework that permits the capture of events from Java objects themselves and the recording and/or processing of such events independent of application programming or object model.

Another embodiment of the present invention provides an electronic business-to-business marketplace having a generic Java rule engine framework that permits the capture of events from Java objects themselves and the recording and/or processing of such events independent of application programming or object model.

As such, it is an object of the present invention to permit a rule engine to be called upon the occurrence of an event within a Java object without requiring the explicit insertion of hooks into the object for invoking the rule.

It is a further object of the present invention to permit a rule engine to be called upon the occurrence of an event within a Java object on an electronic business-to-business marketplace without requiring the explicit insertion of hooks into the object for invoking the rule.

DESCRIPTION OF THE PREFERRED EMBODIMENTS

The present invention will be better understood by reference to the accompanying drawings.

Ideally, events could be captured from the Java objects themselves and then be processed independent of any application programming or any object model. According to an embodiment of the present invention, this can be accomplished through the use of debugging interfaces as will be described below.

JVMDI is a Sun Microsystems specification for debugging. It prescribes that any JVM that can be debugged adhere to the JPDA specification.

A VM supporting the JDPA architecture implements a JVMDI interface which defines the services that the JVM provides. It is possible to hook onto these interfaces and get events from the VM. In order to do this, it must be done in the native language using the JNI interfaces The back-end for the JDWP (Java Debug Wire Protocol) implements this interface and the JDWP uses a transport mechanism, either Shared Memory or Sockets, to transport these events to another JVM that is debugging the current JVM via the JDI (Java Debug Interface) specification.

The JDI defines numerous event requests. Some of those event requests support events that the rule engine would require. These events include the following: 1) Com.sun.jdi.event.ModificationWatchpointEvent, which defines an event that the JVM generates when a particular field of an object is modified; 2) Com.sun.jdi.event.BreakpointEvent, which defines a breakpoint in the JVM execution (for use in a generic framework, it can define when a particular method or all methods have been entered or exited); Com.sun.jdi.event.ClassPrepareEvent, which occurs when the class of the object is first being loaded; Com.sun.jdi.event.VMDeathEvent, which is fired when the Target JVM dies; Com.sun.jdi.event.VMDisconnectEvent, which is fired when the target JVM gets disconnected; and Com.sun.jdi.event.VMStartEvent, which is fired when the target JVM starts. Other events that the JVM fires may be useful as well.

Figure 2:
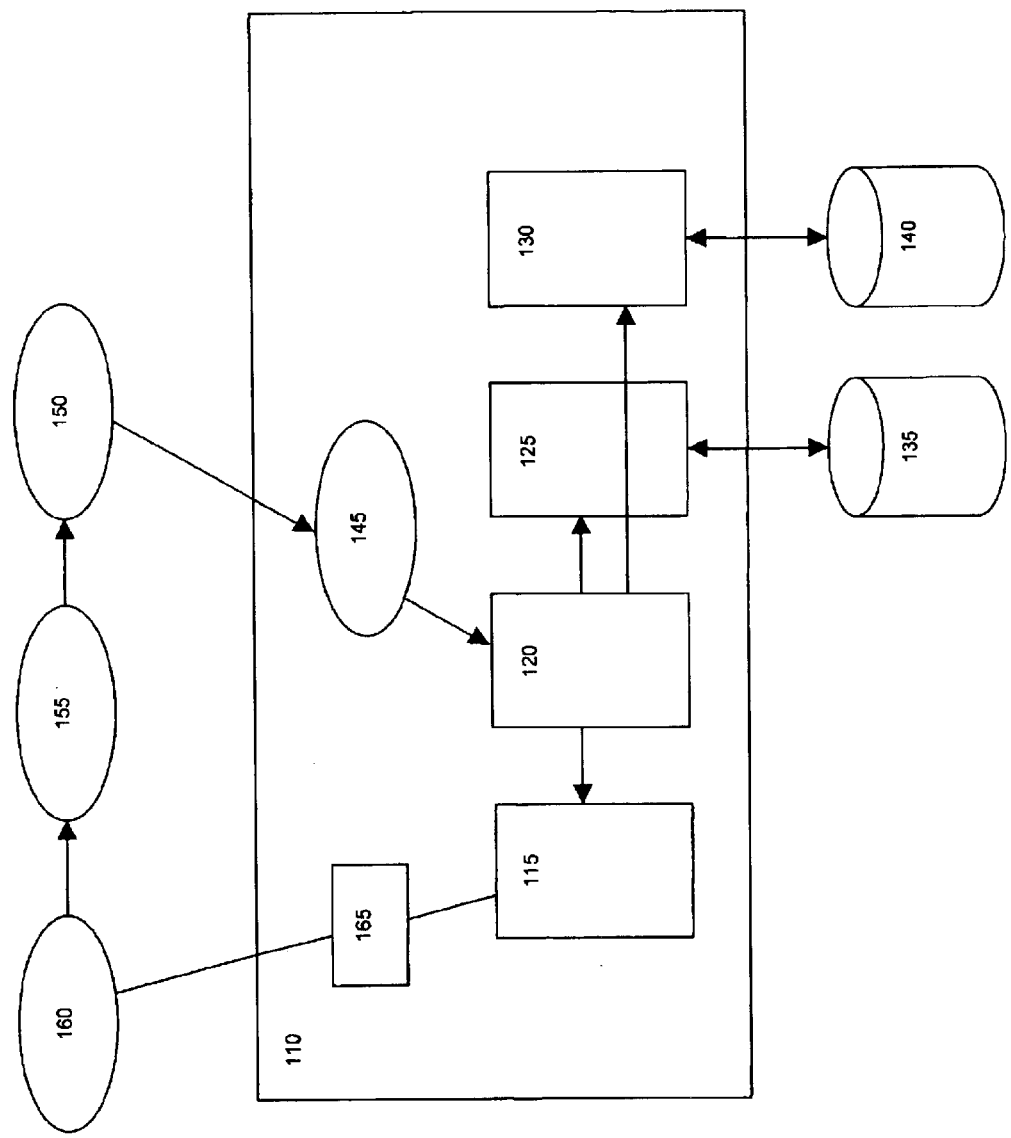
FIG. 2 illustrates a generic Java rule engine framework according to an embodiment of the present invention.

A generic Java rule engine framework according to an embodiment of the present invention is shown in FIG. 2. Hosted/Target JVM 160, the Java object from which events are to be captured, is connected to JVMDI 155. When an event occurs within Hosted/Target JVM 160, the event is fired to JVMDI 155. For instance, an item added to a shopping basket object could cause such an event.

JVMDI 155 then provides the event to JDWP 150. To tie into JVMDI 155, JDWP 150 must be implemented in the native language.

JDWP 150 conveys the event to JDI (Java Debug Interface) 145. JDWP 150 utilizes a transport mechanism, such as shared memory or sockets, to convey the event. JDI 145 provides the event to the event handler thread 120, completing the event capture. If the event is desired to be logged as a business event, logging thread 130 is also called. Logging thread 130 will then record the event in business event capture database 140.

From the event handler thread 120, the rule engine is called in main thread 125 and event definition database 135 is accessed as needed. Java provides a mechanism for dynamic class loading, so the rules could be loaded when needed.

A rule written in Java may need to adhere to an interface that the rule engine recognizes, but the internal code would be Java and the rule developer would write in Java. The design time system could generate the actual code for the Java rule abstracting the user from the details of the context filling.

Rules are executed based on their activation by user options and when events occur on objects in an application. Conditions of the rules may need to be split into individual conditions, and their contexts bound individually to build the NET.

Figure 1:
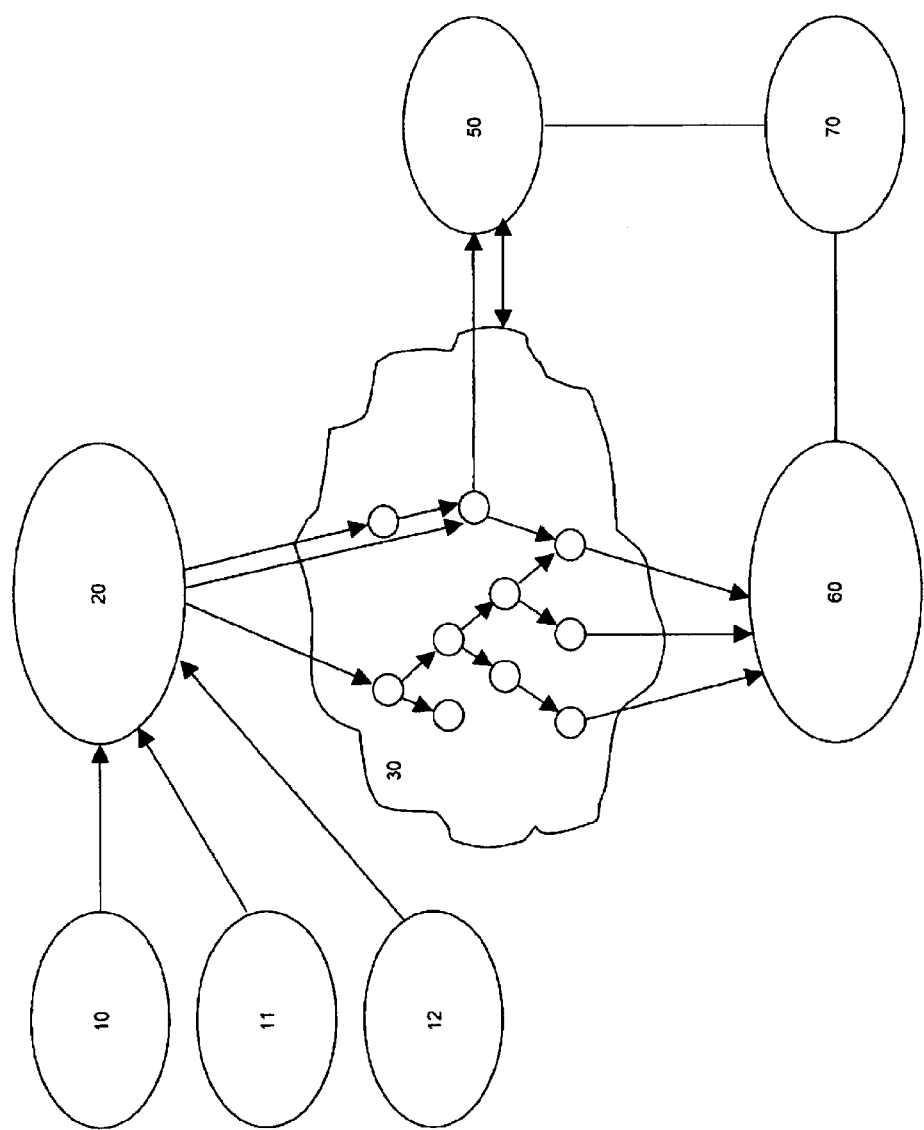
FIG. 1 illustrates the use of a rule engine upon application objects according to the prior art.

Upon the application of the rule in the traditional manner as discussed above in relation to FIG. 1, if a change must be affected in the hosted/target JVM 160, rule callback thread 115 invokes the method to cause the change in hosted/target JVM 160 through an API 165 defined through the JDI interface.

Figure 3:
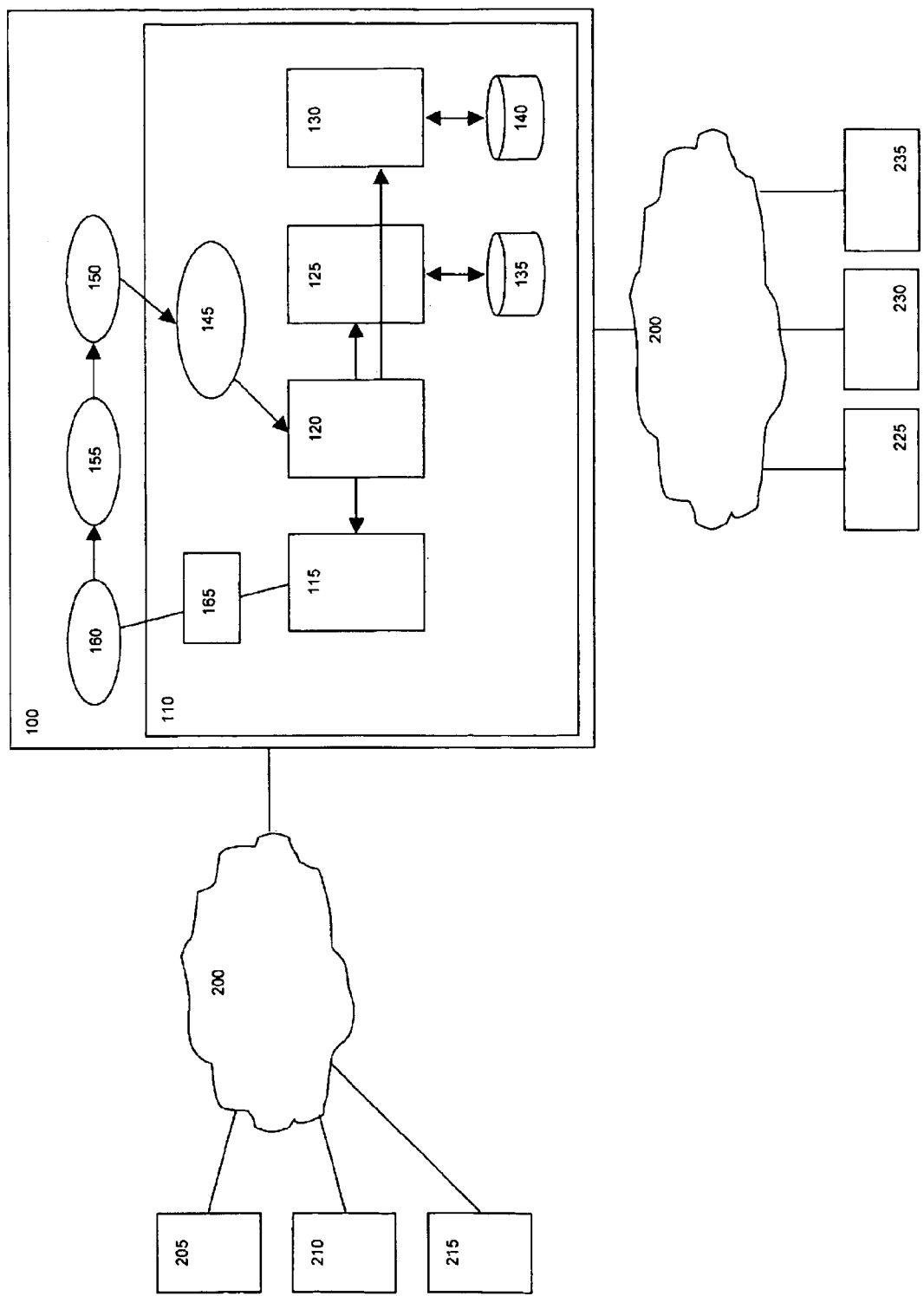
FIG. 3 depicts a block diagram of an electronic marketplace having a generic Java rule engine framework according to an embodiment of the present invention.

An electronic marketplace according to an embodiment of the present invention is shown in FIG. 3. Electronic marketplace 100 is shown having a generic rule engine framework that was described above with respect to FIG. 2. Electronic marketplace 100 is connected to members 205, 210 and 215 and outside services 225, 230 and 235 through a computer network 200 which may be the Internet. Multiple computer networks could also be used. Hosted/target JVM Object 160 within electronic marketplace 100 could be an object used in effectuating electronic commerce.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A generic rule engine framework for a computer system comprising:

a rule engine capable of applying a rule against an object upon an occurrence of an event within said object;

a debugging interface capable of detecting events from said object; and an event handler thread capable of obtaining said event through said debugging interface and providing said event to said rule engine.

2. A generic rule engine framework as in claim 1, wherein said rule engine and said object are programmed in Java.

3. A generic rule engine framework as in claim 1, wherein said rule engine applies said rule through the creation of a RETE Net.

4. A generic rule engine framework as in claim 1, further comprising:

a logging thread capable of logging said event; and a database capable of storing said logged event.

5. A generic rule engine framework as in claim 1, further comprising a rule callback thread capable of invoking a method on said object to affect a change within said object based upon said application of said rule in response to said event.

6. A method of capturing an event from an object and responding to said event without requiring the explicit insertion of hooks into an object comprising:

capturing said event through a debugging interface;

providing said event to a rule engine;

applying a rule in response to said event.

7. A method of capturing an event from an object and responding to said event as in claim 6, wherein said rule engine and said objects are programmed in Java.

8. A method of capturing an event from an object and responding to said event as in claim 6, wherein said applying a rule comprises creating a RETE Net.

9. A method of capturing an event from an object and responding to said event as in claim 6, further comprising logging said event on a database.

10. A method of capturing an event from an object and responding to said event as in claim 6, further comprising affecting said object based upon said application of said rule.

11. An electronic marketplace having a generic rule engine framework comprising:

an object related to electronic commerce;

a rule engine capable of applying a rule against said object upon an occurrence of an event within said object;

a debugging interface capable of detecting events from said object and reporting said events to said rule engine; and an event handler thread capable of obtaining said event through said debugging interface and providing said event to said rule engine.

12. An electronic marketplace as in claim 11, wherein said rule engine and said object are programmed in Java.

13. An electronic marketplace as in claim 11, wherein said rule engine applies said rule through the creation of a RETE Net.

14. An electronic marketplace as in claim 11, further comprising:

a logging thread capable of logging said event; and a database capable of storing said logged event.

15. An electronic marketplace as in claim 11, further comprising a rule callback thread capable of invoking a method on said object to affect a change within said object based upon said application of said rule in response to said event.

16. An article of manufacture comprising:

an electronically accessible medium providing instructions that, when executed by an apparatus, cause the apparatus to:

capture an event from an object via a debugging interface;

provide said event to a rule engine; and apply a rule in response to said event.

17. The article of manufacture of claim 16, wherein the instructions that, when executed by the apparatus, cause the apparatus to apply a rule, cause the apparatus to create a RETE Net.

18. The article of manufacture of claim 16, wherein the instructions that, when executed by the apparatus, cause the apparatus to capture an event, cause the apparatus to log said event on a database.

19. The article of manufacture of claim 16, wherein the instructions that, when executed by the apparatus, cause the apparatus to apply a rule, cause the apparatus to affect said object based upon the application of said rule.

* * * * *